United States Patent [19]
Oliver

[11] 3,847,754
[45] Nov. 12, 1974

[54] RECOVERY OF GLYCOLS FROM MIXED GLYCOL COMPOSITION BY DISTILLATION WITH ACID TREATMENT

[75] Inventor: John M. Oliver, Vidor, Tex.

[73] Assignee: PPG Industries, Inc., Pittsburgh, Pa.

[22] Filed: Jan. 30, 1973

[21] Appl. No.: 327,901

Related U.S. Application Data

[63] Continuation-in-part of Ser. No. 60,592, Aug. 3, 1970, abandoned.

[52] U.S. Cl. .................... 203/34, 203/35, 203/71, 203/98, 260/615 B, 260/637 R
[51] Int. Cl. ...................... C07c 43/10, B01d 3/34
[58] Field of Search ............ 203/34, 35, 98, 71, 78, 203/84; 260/637 R, 637 A, 616, 615 B

[56] References Cited
UNITED STATES PATENTS

| | | | |
|---|---|---|---|
| 3,245,884 | 4/1966 | Kraut | 260/616 |
| 2,788,373 | 4/1957 | Mills | 260/637 R |
| 3,367,847 | 2/1968 | Pierson | 260/637 R |

Primary Examiner—Wilbur L. Bascomb, Jr.
Attorney, Agent, or Firm—Irwin M. Stein; John E. Curley

[57] ABSTRACT

An improved method for the recovery of diethylene glycol and triethylene glycol from a mixed glycol feed comprising monoethylene glycol, diethylene glycol and triethylene glycol is provided. The mixed glycol feed is first distilled, preferably under reduced pressure, to provide an overhead of monoethylene glycol and a monoethylene glycol bottoms of predominantly diethylene glycol and triethylene glycol. The pH of said bottoms is then preferably adjusted to between about 6 and about 8.5 and distilled to provide a diethylene glycol overhead and a diethylene glycol bottoms of predominantly triethylene glycol. The pH of said bottoms is then adjusted to between about 6 and about 8.5 and distilled to recover triethylene glycol overhead. The triethylene glycol bottoms can then be adjusted to a pH within the aforesaid range and distilled to recover more triethylene glycol overhead. The diethylene glycol and triethylene glycol products are recovered having less color than when pH adjustment is not performed, and the triethylene glycol is recovered in greater yield.

17 Claims, 1 Drawing Figure

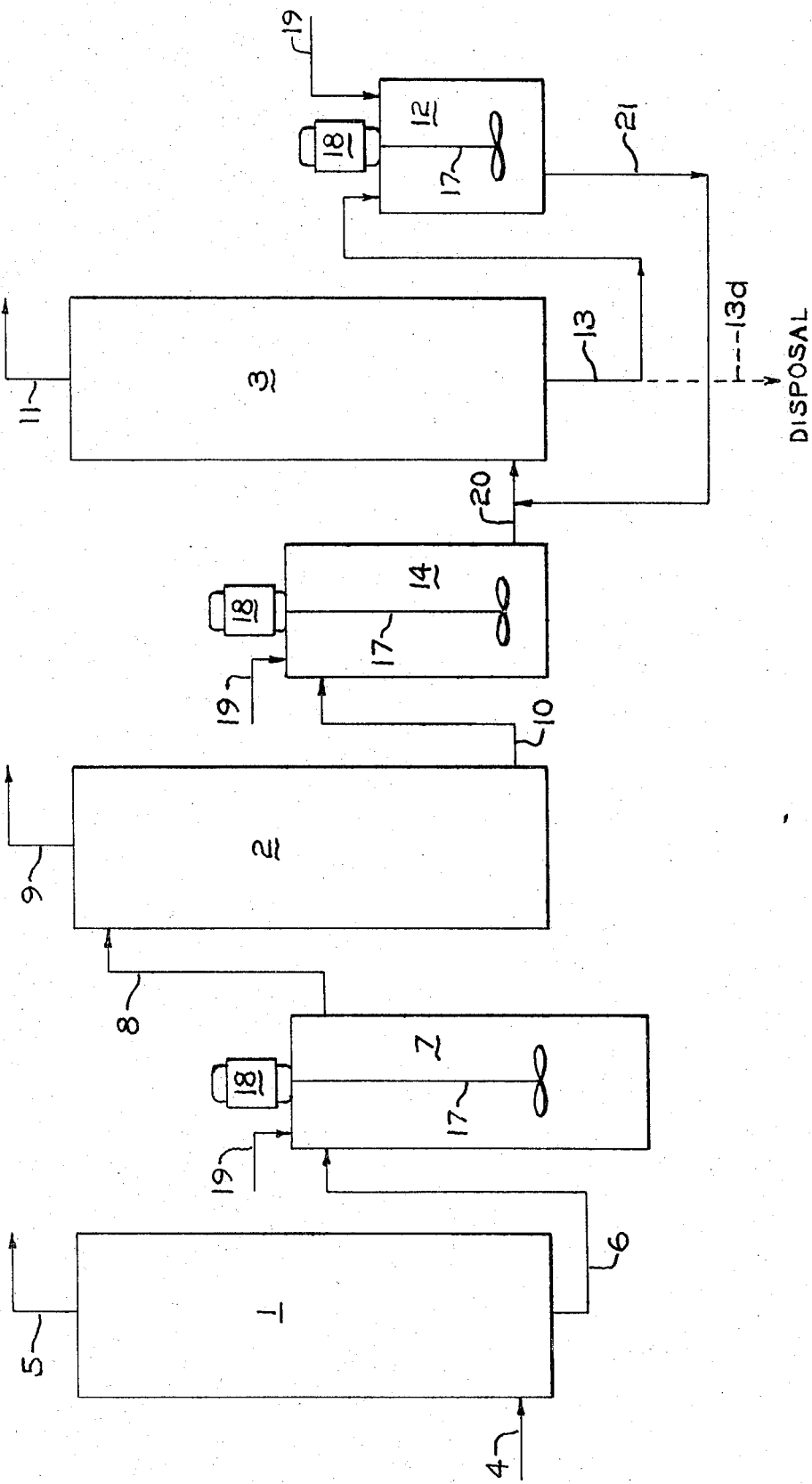

RECOVERY OF GLYCOLS FROM MIXED GLYCOL COMPOSITION BY DISTILLATION WITH ACID TREATMENT

CROSS REFERENCE OF RELATED APPLICATION

This application is a continuation-in-part of U.S. Ser. No. 60,592, filed Aug. 3, 1970, in the name of John M. Oliver, now abandoned.

BACKGROUND OF THE INVENTION

In the manufacture of glycols from ethylene oxide and water mixed glycol products are typically obtained. Thus, it is typical in these operations to recover a mixture of triethylene glycol, diethylene glycol, and monoethylene glycol. This mixture is separated by several distillations into its individual components. It has been found in the past during the recovery of monoethylene glycol, diethylene glycol and triethylene glycol or mixtures of these materials that frequently the diethylene glycol and triethylene glycol products contain color bodies, apparently caused by decomposition, that render the quality of these products below commercial specification. Further, the quantity of triethylene glycol recovered from such mixed glycols has been low. Typically the triethylene glycol bottoms from the last distillation column in a series of columns contain as much as 40 percent or more by volume of triethylene glycol which was not recovered in the distillation, and ordinarily was discarded.

A method for removing color impurities from mixed glycols is described by Kraut, U.S. Pat. No. 3,245,884. There a mixed glycol feed is fractionally distilled into two fractions and each fraction recovered is then treated with steam to remove the color impurities. Before the steam treatment, however, Kraut describes that it is desirable to adjust the pH of the mixed glycol feed to about 7 to prevent violent decomposition during the distillation. While this is a useful method for removing color impurities, it would be preferable if the formation of color impurities could be inhibited.

SUMMARY OF THE INVENTION

It has now been discovered that monoethylene glycol, diethylene glycol and triethylene glycol products that are low in color impurities can be recovered from a mixed glycol feed comprising monoethylene glycol, diethylene glycol and triethylene glycol by distilling the mixed glycol feed to provide an overhead of monoethylene glycol and a monoethylene glycol bottoms of predominantly diethylene glycol and triethylene glycol, adjusting the pH of such bottoms to between about 6 and about 8.5 and distilling the so-adjusted bottoms to provide a diethylene glycol overhead and a diethylene glycol bottoms of predominantly triethylene glycol, adjusting the pH of said diethylene glycol bottoms to between about 6 and about 8.5 and distilling the so-adjusted bottoms to recover triethylene glycol overhead. The triethylene glycol bottoms can then be adjusted to a pH between about 6 and about 8.5 and the triethylene glycol bottoms distilled to recover more triethylene glycol overhead. Quite surprisingly it has been found that an increased amount of triethylene glycol is recovered and both the diethylene glycol and triethylene glycol overhead products contain less color impurities than when the pH is not adjusted. Further, it has been found that when the distillation is conducted under reduced pressure the formation of color bodies is further inhibited.

The distillations are preferably conducted at a reduced pressure of less than about 20 millimeters of mercury, and more preferably between about 4 and about 11 millimeters of mercury in order to inhibit decomposition and the formation of color impurities.

In general the temperatures encountered in the distillation column are as follows. In the monoethylene glycol recovery column the monoethylene glycol bottoms temperature is between about 350°F. and about 355°F. with the overhead temperature (taken at a point near the top of the column) between about 198°F. and about 200°F. In the second column from which diethylene glycol is recovered as overhead, a diethylene glycol bottoms temperature of between about 365°F. and about 375°F. is typical with the overhead ranging between about 245°F. and about 250°F. In the last column from which triethylene glycol is recovered as overhead, triethylene glycol bottoms temperatures of between about 380°F. and about 390°F. are typical with the overhead temperature ranging between about 275°F. and about 280°F. The above temperatures assume sub-atmospheric pressure conditions at the top of the columns of between about 4 and about 11 millimeters of mercury pressure, and most preferably between about 9 and about 11 for the monoethylene glycol column and between about 4 and about 6 millimeters of mercury for both the diethylene glycol and triethylene glycol columns.

BRIEF DESCRIPTION OF THE DRAWING

For a more complete understanding of the present invention, reference is made to the accompanying drawing which shows a flow sheet depicting the preferred method or process of the present invention.

DETAILED DESCRIPTION OF THE INVENTION

In the drawing there is shown diagrammatically three distillation columns 1, 2 and 3. Column 1 is provided with a feed line 4, a product discharge line 5 and a bottoms discharge line 6. Bottoms discharge line 6 feeds into a storage and pH adjustment tank 7. Tank 7, as well as tanks 12 and 14, is fitted with an agitator 17 driven by a motor 18 and the acidic material, e.g., mineral acid, is added via line 19. Continuous agitation of the contents of tanks 7, 12, and 14 is preferred to insure better pH control. A feed line 8 from tank 7 enters column 2 at a point near the top. Column 2 is also provided with a product discharge line 9 and a bottoms discharge line 10. Bottoms discharge line 10 enters tank 14 at a point near the top. Line 20 feeds material from tank 14 to a point near the bottom of column 3. Column 3 is provided with a product discharge line 11 and a bottoms discharge line 13. Column 3 is shown connected to tank 12 via line 13. The material stored in tank 12 is then fed to column 3 via line 21 after adjusting the pH to the desired range. If it is not desired to treat the bottoms from column 3, they can be discharged via line 13d.

In the preferred operation of the invention, as shown in the drawing, a mixed stream of monoethylene glycol, diethylene glycol and triethylene glycol is fed via line 4 into column 1. In column 1 the stream is subjected to distillation, which at a pressure of 10 millimeters of mercury as measured at the top of the column, results in the operation of column 1 at a bottoms temperature of about 352°F. and an overhead temperature of about 198°F. Under these conditions an overhead product of essentially pure monoethylene glycol is withdrawn via line 5. The bottoms product from this column is passed via line 6 to tank 7 and the pH is adjusted, preferably continuously as required, to between about 6 and about 8.5 by the addition of acid from line 19. Tank 7 is provided with an agitator 17 which is preferably driven continuously by a suitable motor 18. From tank 7 the material is passed to column 2 via line 8. The material entering column 2 via line 8 is subjected to a distillation in column 2, which at a pressure of 5 millimeters of mercury, results in a bottoms temperature of about 368°F. and an overhead temperature of about 245°F. Under these temperature conditions, diethylene glycol is recovered overhead as product through line 9 and the diethylene glycol bottoms product containing predominantly all triethylene glycol and impurities is removed via line 10. This material is fed from line 10 to tank 14 which likewise is provided with an agitator 17 driven by a suitable motor 18. Acid is added to tank 14 via line 19 in a quantity sufficient to provide a pH between about 6 and about 8.5. The material from tank 14 after acid treatment is then fed via line 20 to column 3 where it is subjected to a distillation. In this column, at a pressure of 5 millimeters of mercury, the overhead temperature is 275°F., and the bottoms temperature is 380°F. Triethylene glycol product is removed via line 11 and the residue or bottoms is removed via line 13 for subsequent treatment to recover useful product or for disposal.

When the triethylene glycol content of the triethylene glycol bottoms from column 3 is 40 percent by volume or greater, it is preferably fed via line 13 to tank 12. In tank 12 the pH is adjusted by acid addition to between about 6 and about 8.5. The material is then subjected to further distillation in column 3 and more triethylene glycol product is recovered via line 11.

When the quantity of triethylene glycol in line 13 is less than 40 percent by volume and it is not desired to recover this in a special treatment-distillation procedure as described above for streams containing larger quantities of triethylene glycol, the triethylene glycol bottoms from column 3 can be fed via lines 13 and 13d for disposal.

In the preferred mode of practicing the present invention, sulfuric acid or phosphoric acid are utilized in the pH adjustment steps described herein.

In the flow sheet the columns have been shown diagrammatically for illustrative purposes only. The actual columns used may take any convenient form for these distillations. Thus, simple tray columns or columns packed with various materials such as Raschig rings, Berl saddles and the like may be utilized to conduct the distillations in accordance with this invention.

The distillations are preferably conducted in separate zones or columns as this permits the pH of the bottoms to be more easily adjusted before the subsequent distillation step is instituted. In a fractional distillation column however, maintaining the bottoms around a neutral pH is difficult and requires more elaborate and expensive equipment. Further, improved results can be obtained than heretofore if only one of the diethylene glycol bottoms and triethylene glycol bottoms are pH adjusted before distillation but for best results both bottoms are pH adjusted.

The pH of the glycol mixture is typically alkaline and can be adjusted in any suitable manner by, for example, adding an acidic material such as, for example, carbon dioxide or a strong mineral acid. Typical acids include sulfuric acid, phosphoric acid, hydrochloric acid and nitric acid. Strong organic acids such as acetic and oxalic acid can also be employed. In general, any strong acid that has a first ionization constant of $1 \times 10^{-5}$ or greater can be employed. It is preferred that all acids used be used in concentrated form to minimize the quantity of water added to the system, but the concentration of the acid is not critical. The quantity of acid added will, of course, depend upon its concentration and the pH desired.

When the method of the invention is conducted by the preferred use of separate distillation columns, a convenient method of adjusting the pH of the diethylene glycol and triethylene glycol bottoms is to pass the diethylene glycol and triethylene glycol bottoms to a separate tank, prior to distillation, wherein the acid can be added and thoroughly mixed with the bottoms and then the bottoms can be passed to the next distillation column.

The following examples are illustrative of the method of the present invention.

EXAMPLE I

Using a series of distillation columns such as depicted in the drawing a feed stream of monoethylene glycol, diethylene glycol and triethylene glycol which had produced off specification triethylene glycol under a conventional distillation (one in which no acid was added) is fed via line 4 to column 1. In column 1, which is operated at a pressure of 10 millimeters of mercury, a bottoms temperature of 350°F. and an overhead temperature of 198°F., monoethylene glycol is recovered overhead through line 5. This distillation is carried out continuously and the monoethylene glycol bottoms containing diethylene glycol and triethylene glycol is discharged into tank 7 and adjusted to a pH of 6 by the addition of concentrated phosphoric acid from line 19. Motor 18 is activated to drive agitator 17 and thereby thoroughly mix the glycols and acid. From tank 7 the neutralized liquid is fed to column 2 which is operated at a pressure of 5 millimeters of mercury, a bottoms temperature of 365°F. and an overhead temperature of 245°F. Diethylene glycol is recovered as overhead through line 9 and the diethylene glycol bottoms during 288 hours of distillation is continuously fed into tank 14 through line 10. To this diethylene glycol bottoms, containing principally triethylene glycol, and which is at a pH of 10, concentrated (65 percent by weight) sulfuric acid is added in tank 14 via line 19 to achieve a pH of 6.5 and the motor 18 is activated to drive agitator 17 and thereby mix thoroughly the glycol and acid. The glycol at pH 6.5 is then fed to column 3 which operates at 5 millimeters of mercury, has a bottoms temperature of 380°F. and an overhead temperature of 275°F. Triethylene glycol is removed via line 11. The diethylene glycol distillate was found to have a residual APHA color of less than 10, whereas a residual APHA color of about 25 is usually obtained when the bottoms are not pH adjusted as shown herein. The triethylene glycol distillate had a residual APHA color of 15 or less whereas it has an APHA color of 40 to 70 or more when the bottoms are not pH adjusted as shown herein.

The APHA residual color was determined by the method described in ASTM D-1209.

EXAMPLE II

Twenty eight hundred gallons of bottoms from a triethylene glycol distillation column, such as column 3 of the accompanying drawing, is passed through line 13 to tank 12. Concentrated sulfuric acid (0.67 gallon of 65 percent by weight) was added via line 19 to the glycol contained in tank 12, which was 50 percent by volume triethylene glycol and thoroughly mixed with the glycol to provide a pH of 7 from an initial pH of 10. This acid adjusted material is forwarded to column 3 where it is distilled under a pressure of 5 millimeters of mercury at a bottoms temperature of 390°F. and an overhead temperature of 275°F. During this distillation, 34 percent of the triethylene glycol contained in the feed (which otherwise would have been discarded) is recovered overhead. The column bottoms is removed via line 13 and 13d for disposal.

While the invention has been described with reference to certain specific modes of operation and in connection with a specific drawing, it is of course to be understood that the invention is not to be limited thereby except insofar as appears in the accompanying claims.

I claim:

1. A method of recovering monoethylene glycol, diethylene glycol and triethylene glycol from mixed glycol feed comprising monoethylene glycol, diethylene glycol and triethylene glycol, comprising distilling the mixed glycol feed to provide an overhead product of monoethylene glycol and a monoethylene glycol bottoms product of predominantely diethylene glycol and triethylene glycol, adjusting the pH of said bottoms product with acidic material to between about 6 and about 8.5, distilling under reduced pressure so-adjusted bottoms product to provide a diethylene glycol overhead product and a diethylene glycol bottoms product of predominantly triethylene glycol, adjusting the pH of said diethylene glycol bottoms product with acidic material to between about 6 and about 8.5 and distilling under reduced pressure so-adjusted bottoms to provide an overhead product of triethylene glycol.

2. A method of recovering diethylene glycol from a mixed glycol feed comprising monoethylene glycol, diethylene glycol and triethylene glycol, comprising distilling the mixed glycol feed to provide an overhead product of monoethylene glycol and a bottoms product of predominantly diethylene glycol and triethylene glycol, adjusting the pH of said bottoms product with acidic material to between about 6 and about 8.5 and distilling under reduced pressure so-adjusted bottoms product to provide an overhead product of diethylene glycol.

3. A method of recovering triethylene glycol from a mixed glycol feed comprising predominantly diethylene glycol and triethylene glycol, comprising distilling under reduced pressure the mixed glycol feed to provide an overhead product of diethylene glycol and a bottoms product of predominantly triethylene glycol, said mixed glycol feed having a pH between about 6 and about 8.5, adjusting the pH of said bottoms product with acidic material to between about 6 and about 8.5 and distilling under reduced pressure so-adjusted bottoms product to provide an overhead product of triethylene glycol.

4. A method of recovering triethylene glycol from a triethylene glycol bottoms product containing more than about 40 percent by volume triethylene glycol and having a pH of at least 9, said product resulting from the distillation of a glycol feed comprising predominantly triethylene glycol, comprising adjusting the pH of said bottoms product with acidic material to between about 6 and about 8.5 and distilling under reduced pressure so-adjusted bottoms product to provide an overhead product of triethylene glycol.

5. The method of claim 1 wherein the distillations conducted under reduced pressure are conducted between about 4 and about 11 millimeters of mercury and the acidic material is sulfuric or phosphoric acid.

6. The method of claim 2 wherein the distillations conducted under reduced pressure are conducted between about 4 and about 11 millimeters of mercury and the acidic material is sulfuric or phosphoric acid.

7. The method of claim 3 wherein the distillations conducted under reduced pressure are conducted between about 4 and about 11 millimeters of mercury and the acidic material is sulfuric or phosphoric acid.

8. The method of claim 4 wherein the distillation conducted under reduced pressure is conducted of between about 4 and about 11 millimeters of mercury and the acidic material is sulfuric or phosphoric acid.

9. The method of claim 1 wherein the acidic material is a mineral acid having a first ionization constant of $1 \times 10^{-5}$ or greater.

10. The method of claim 2 wherein the acidic material is a mineral acid having a first ionization constant of $1 \times 10^{-5}$ or greater.

11. The method of claim 3 wherein the acidic material is a mineral acid having a first ionization constant of $1 \times 10^{-5}$ or greater.

12. The method of claim 4 wherein the acidic material is a mineral acid having a first ionization constant of $1 \times 10^{-5}$ or greater.

13. The method of claim 1 wherein the monoethylene glycol bottoms temperature is between about 350°F. and about 355°F., the diethylene glycol bottoms temperature is between about 365°F. and about 375°F., the triethylene glycol bottoms temperature is between about 380°F. and about 390°F. and the distillations are conducted at a reduced pressure of between about 4 and about 11 millimeters of mercury.

14. The method of claim 2 wherein the diethylene glycol bottoms temperature is between about 365°F. and about 375°F. and the distillation is conducted under a pressure of between about 4 and about 6 millimeters of mercury.

15. The method of claim 3 wherein the triethylene glycol bottoms temperature is between about 380°F. and about 390°F. and the distillation is conducted under a reduced pressure of between about 4 and about 6 millimeters of mercury.

16. The method of recovering monoethylene glycol, diethylene glycol, and triethylene glycol from a mixed glycol feed comprising monoethylene glycol, diethylene glycol, and triethylene glycol, comprising distilling the mixed glycol feed in a first distillation column at a reduced pressure of between about 9 and about 11 millimeters of mercury to provide an overhead of monoethylene glycol at a temperature of between about 198°F. and about 200°F. and a monoethylene glycol bottoms of predominantly diethylene glycol and triethylene glycol at a temperature of between about 350°F.

and about 355°F.; adjusting the pH of said bottoms to between about 6 and about 8.5 with a mineral acid having a first ionization constant of $1 \times 10^{-5}$ or greater, distilling such bottoms in a second distillation column at a reduced pressure between about 4 and about 6 millimeters of mercury to provide a diethylene glycol overhead at a temperature of between about 245°F. and about 250°F. and a diethylene glycol bottoms of predominantly triethylene glycol at a bottoms temperature of between about 365°F. and about 375°F.; adjusting the pH of said diethylene glycol bottoms to between about 6 and about 8.5 with a mineral acid having a first ionization constant of $1 \times 10^{116\ 5}$ or greater, and distilling such bottoms in a third distillation column at a reduced pressure of between about 4 and about 6 millimeters of mercury to provide an overhead product of triethylene glycol at a temperature between about 275° and 280°F.

17. A method of recovering triethylene glycol from a triethylene glycol bottoms product containing more than 40 percent by volume triethylene glycol and having a pH of at least 9, said product resulting from the distillation of a glycol feed comprising predominantly triethylene glycol, comprising adjusting the pH of said bottoms product to between about 6 and about 8.5 with a mineral acid having a first ionization constant of $1 \times 10^{-5}$ or greater, distilling so-adjusted triethylene glycol bottoms product at a bottoms temperature between about 380°F. and 390°F. and at a reduced pressure of between about 4 and about 6 millimeters of mercury to provide an overhead product of triethylene glycol at an overhead temperature between about 275° and about 280°F.

* * * * *

UNITED STATES PATENT OFFICE
CERTIFICATE OF CORRECTION

Patent No. 3,847,754          Dated December 30, 1974

Inventor(s) John M. Oliver

It is certified that error appears in the above-identified patent and that said Letters Patent are hereby corrected as shown below:

In the title: The word "composition" should read ---compositions---.

Column 7, line 13, the figure:

$1 \times 10^{116.5}$     should read     $1 \times 10^{-5}$

Signed and sealed this 11th day of February 1975.

(SEAL)
Attest:

RUTH C. MASON
Attesting Officer

C. MARSHALL DANN
Commissioner of Patents
and Trademarks